(12) United States Patent
Lu

(10) Patent No.: US 6,200,449 B1
(45) Date of Patent: Mar. 13, 2001

(54) WATER TREATING APPARATUS WITH ELECTRO-CHEMISTRY PROCESS

(75) Inventor: Fang Chung Lu, Chong Ho (TW)

(73) Assignee: Silkroad Corp., Taipei Hsien (TW); a part interest ( * ) Notice: Subject to any disclaimer, the term of this patent is extended or adjusted under 35 U.S.C. 154(b) by 0 days.

(21) Appl. No.: 09/326,997

(22) Filed: Jun. 7, 1999

(51) Int. Cl.[7] .................................................. B03C 5/02

(52) U.S. Cl. .......................... 204/665; 204/672; 204/554; 205/753

(58) Field of Search .................................. 204/665, 672, 204/554, 753

(56) References Cited

U.S. PATENT DOCUMENTS 4,004,994 * 1/1977 Andrus ................................. 204/149
5,558,755 * 9/1996 Gardner-Clayson et al. ....... 205/753

* cited by examiner

*Primary Examiner*—Kathryn Gorgos
*Assistant Examiner*—Thomas H. Parsons

(57) ABSTRACT

One or more water treating devices each includes a housing for receiving a number of electric conductive particles and a filter plate secured in the housing for supporting the particles in the housing. The waste water to be treated is introduced into the housing and flows through the particles when the particles are electrified for allowing the particles to treat the water. The particles, after use, may be discharged from the housing so as to be cleaned. The water treating devices may be arranged in series or in parallel or in both series and parallel.

7 Claims, 7 Drawing Sheets

US 6,200,449 B1

WATER TREATING APPARATUS WITH ELECTRO-CHEMISTRY PROCESS

BACKGROUND OF THE INVENTION

1. Field of the Invention

The present invention relates to a water treating apparatus, and more particularly to a water treating apparatus using electro-chemistry processes.

2. Description of the Prior Art

Typical water treating devices comprise a number of filtering stations for filtering the waste water, and a number of treating stations for treating the waste water by such as chemical materials or by chemical processes. It takes a long time and a number of stations to filter and to treat the waste water before the treated water may be used again.

The present invention has arisen to mitigate and/or obviate the afore-described disadvantages of the conventional water treating devices.

SUMMARY OF THE INVENTION

The primary objective of the present invention is to provide a water treating apparatus for effectively treating the waste water with electro-chemistry processes.

In accordance with one aspect of the invention, there is provided a water treating apparatus comprising at least one water treating device including a) a housing having a chamber formed therein and having a lower portion, a middle portion and an upper portion, the housing including an entrance for receiving water to be treated and including an exit for discharging the water, b) a plurality of electric conductive particles disposed in the chamber of the housing, c) a filter plate secured in the middle portion of the housing for supporting the particles in the chamber of the housing and for allowing the water to flow through the filter plate and the particles, and d) means for electrifying the particles to treat the water.

The electrifying means includes a pair of electrode boards secured in the housing, and means for energizing the electrode boards. A device may further be provided for cleaning the particles after the particles are discharged from the housing. A further device may further be provided for supplying the particles into the chamber of the housing. Another device may further be provided for introducing the water into the housing. A further device may further be provided for adjusting a PH value of the water. A container may further be coupled to the housing for receiving the water after being treated.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
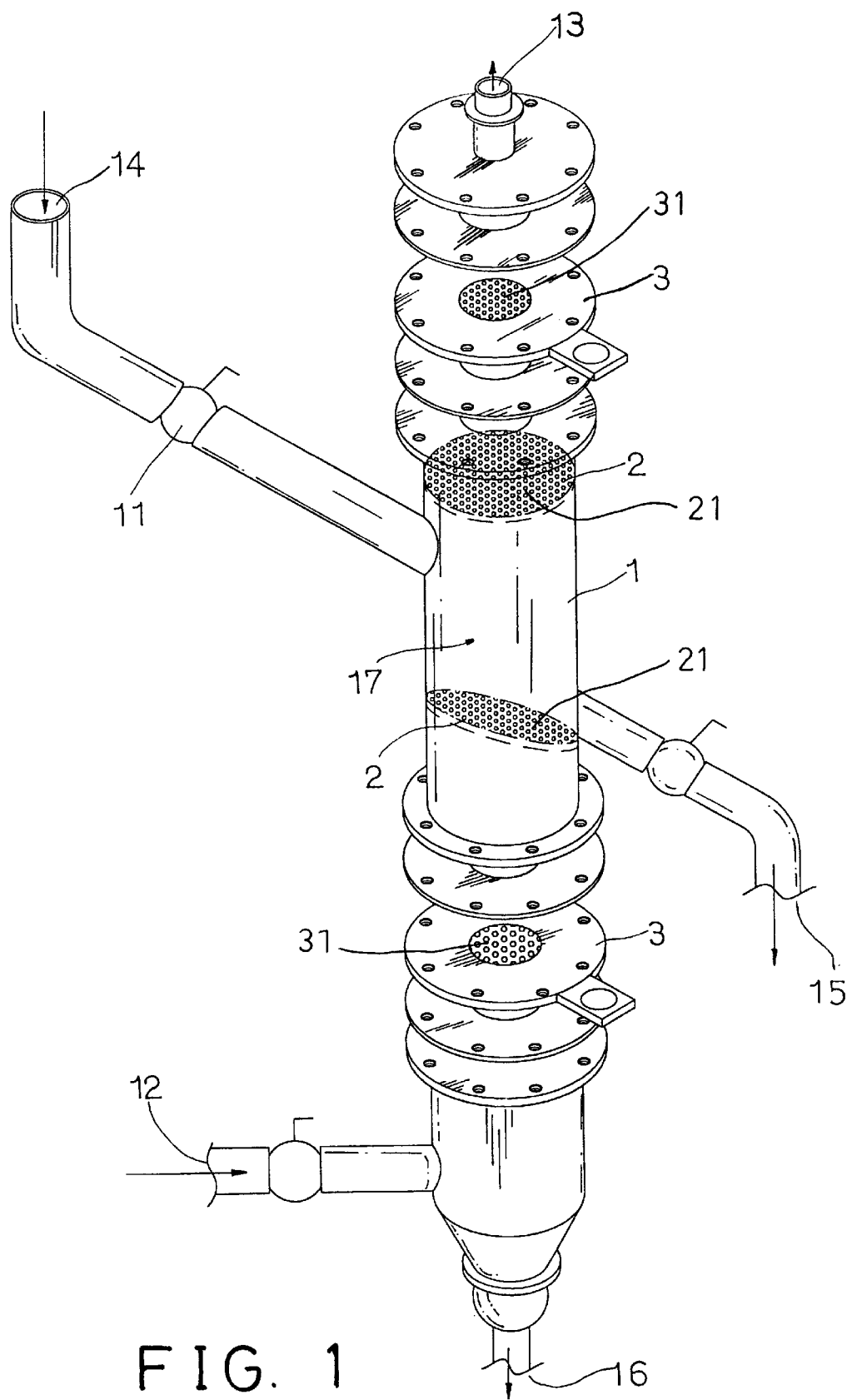
FIG. 1 is an exploded view of a water treating device in accordance with the present invention.
Figure 2:
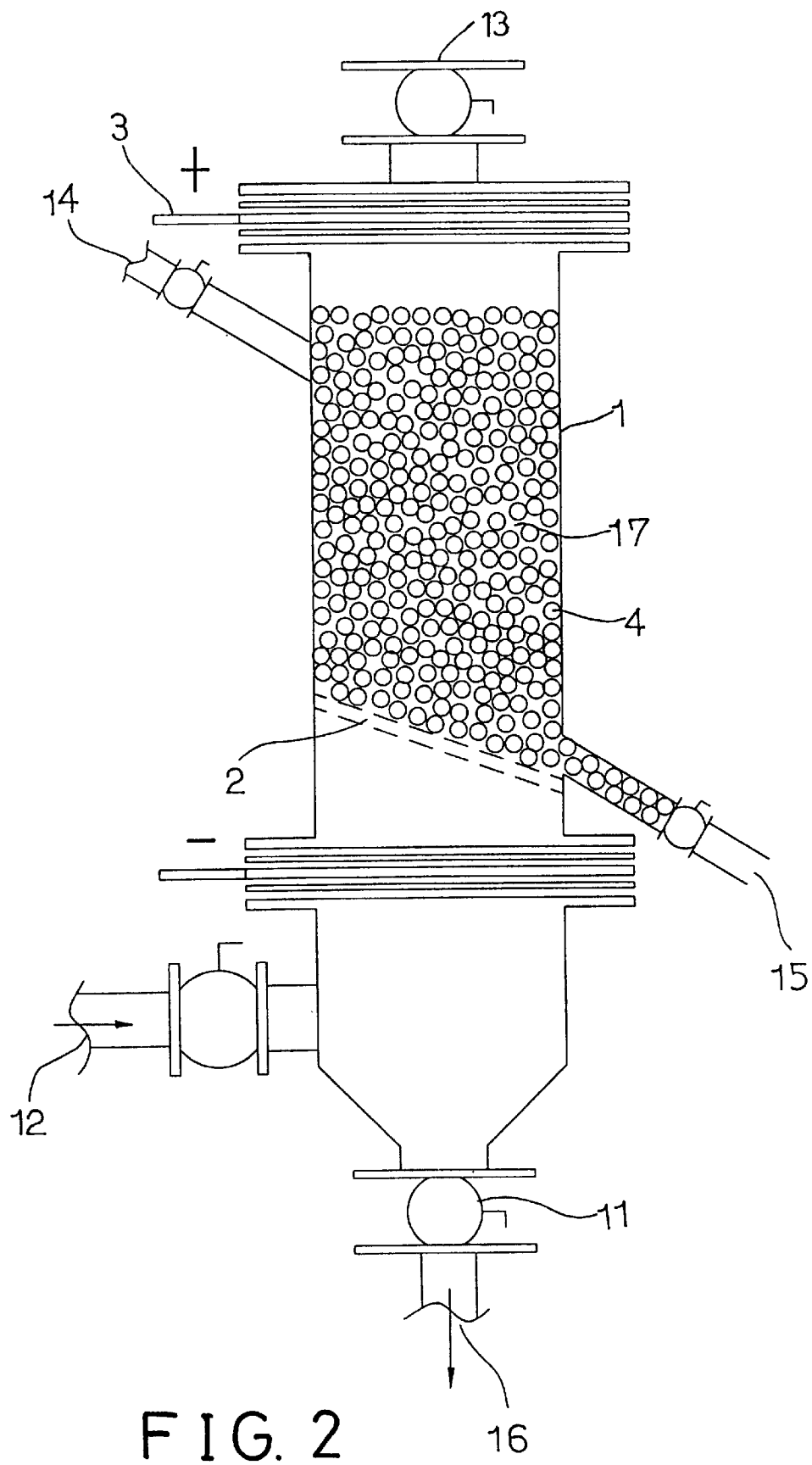
FIG. 2 is a cross sectional view of the water treating device.
Figure 5:
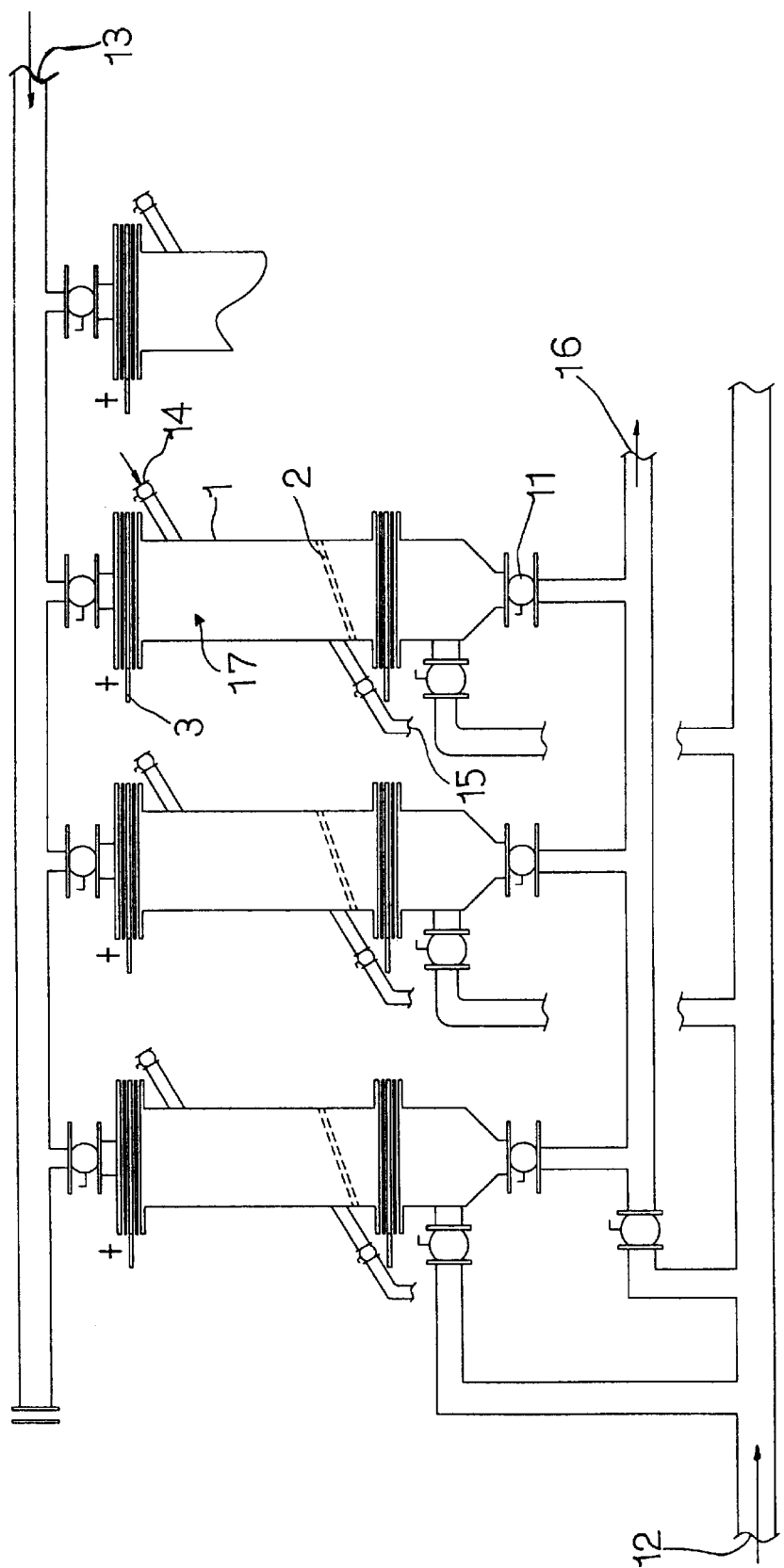
Figure 6:
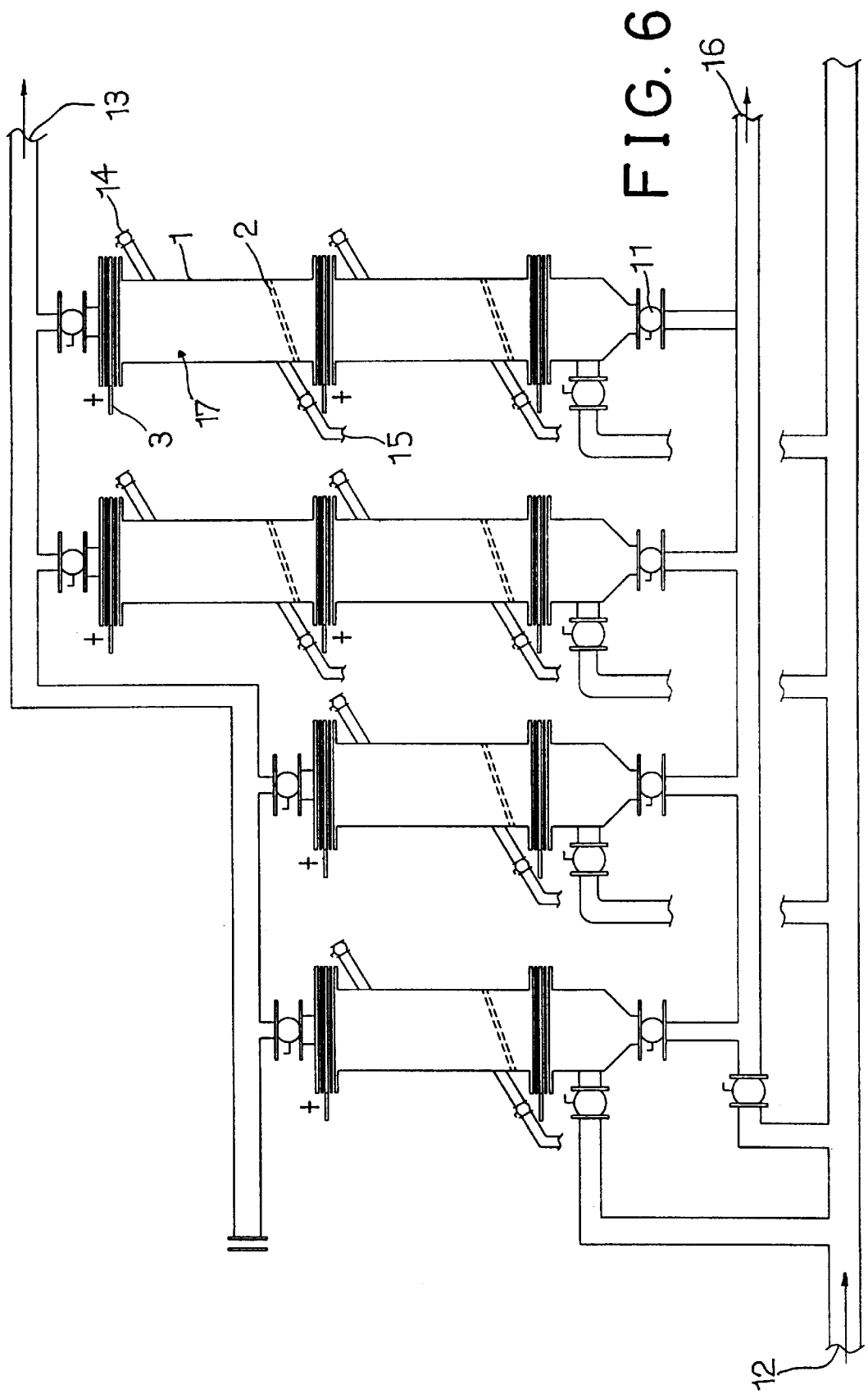

Referring to the drawings, and initially to FIGS. 1 and 2, a water treating apparatus in accordance with the invention comprises one or more water treating devices which may be assembled together in series (FIG. or in parallel to each other (FIG. 5) or in both series and parallel arrangement (FIG. 6). One of the water treating devices is shown in FIGS. 1 and 2, and includes a housing 1 having a filter plate 2 secured on top and having another filter plate 2 secured in the middle portion thereof, and having a chamber 17 defined between the filter plates 2 for receiving a number of particles 4. The housing 1 includes an inlet 14 provided in the upper portion for filling the particles 4 into the housing 1, and includes an outlet 15 provided in the lower portion for discharging the particles 4. The middle filter plate 2 is preferably disposed inclined relative to the housing 1 for guiding the particles 4 toward the outlet 15 of the housing 1 and for allowing the particles 4 to be easily and quickly discharged from the housing 1 via the outlet 15 and for changing the particles 4. The filter plates 2 each includes a number of openings 21 (FIG. 1) formed therein for allowing the water to flow through the filter plates 2 and for allowing the greater particles to be filtered by the filter plates 2. The size of the housing 1 and the volume or the number of the particles 4 may be selected or may be made according to the water quantity to be treated.

The housing 1 further includes an entrance 12 formed below the middle filter plate 2 for receiving the waste water to be treated and for allowing the waste water to flow into the housing 1 and to flow through the filter plates 2 and the particles 4. The housing 1 includes an exit 13 formed above the upper filter plate 2 for discharging the treated water. The housing 1 may further include a discharge pipe 16 attached to the bottom thereof for discharging the collected dirt or particles. Some of the dirt and smaller particles that flow through the filter plate 2 may also be filtered by the particles 4 and may be collected in the bottom portion of the housing 1 and may be discharged through the discharge pipe 16 when required. The inlet 14, the outlet 15, the entrance 12, the exit 13, and the discharge pipe 16 may each include a valve 11, such as an electromagnetic valve, for controlling the water and the particles 4 to flow into and out of the housing 1. The valves 11 may be coupled to a computer or a microprocessor for allowing the valves 11 to be controlled automatically by the microprocessor. The valves 11 may also be operated manually.

An electrode board 3 is disposed in the middle portion of the housing 1 and preferably arranged between the water entrance 12 and the middle filter plate 2. Another electrode board 3 is disposed in top of the housing 1 and disposed above the upper filter plate 2. The electrode boards 3 each include a number of openings 31 formed therein for allowing the water to flow through the electrode boards 3. The electrode boards 3 are preferably made of such as steel, graphite, etc., and are coupled to the electrodes of a power supply, such as a battery 45 (FIG. 7), which may energize or may supply the electricity to the particles 4 or which may electrify the particles 4 (FIG. 3), by supplying the electric field and/or the electric current through the electrode boards 3 and the particles 4. The particles 4 may be of any shape, particularly a spherical shape, and are made of electric conductive materials, such as metal, aluminum, lead or magnesium, etc., such that the particles 4 may be electrified.

Figure 3:
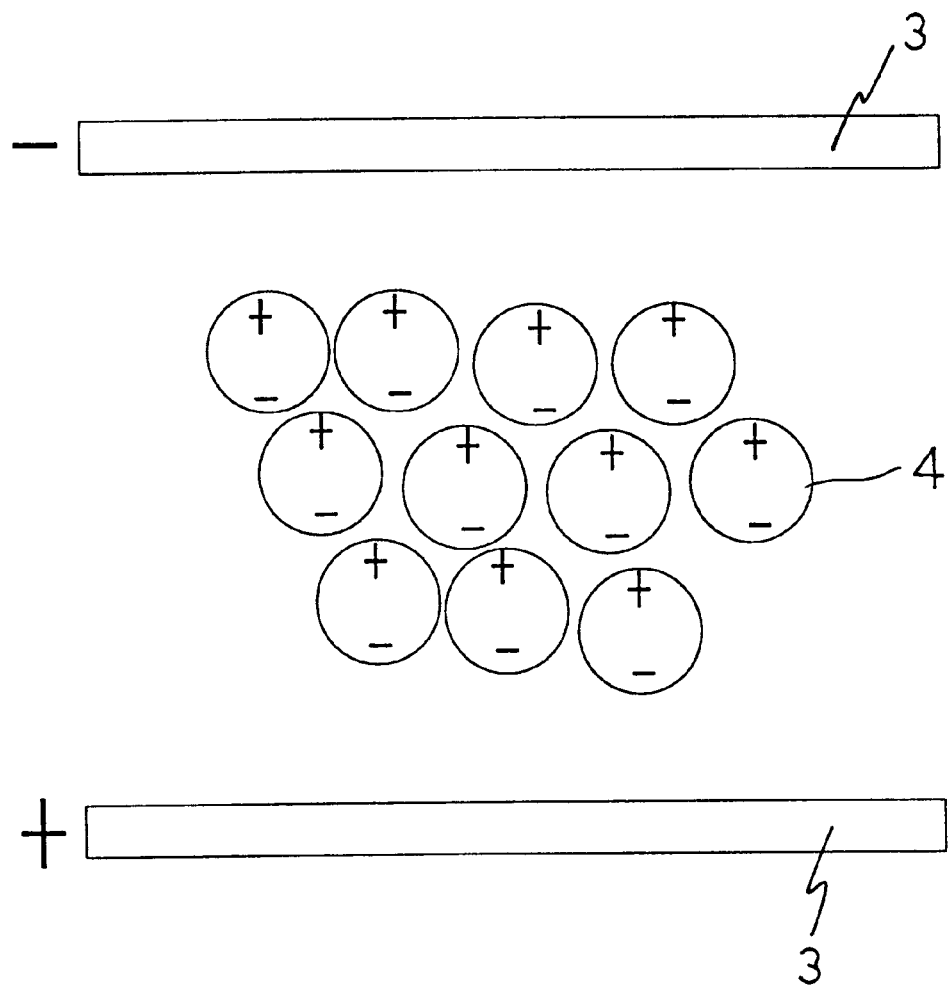
FIG. 3 is a schematic view illustrating the operation of the water treating device.

In operation, the waste water flowing through the electrode boards 3, and the particles 4 may be subjected an oxidation treatment, and/or an electrolytic action, and/or an electronation treatment, and/or a neutralization treatment, and/or a corrosive action when the electrode boards 3 and the particles 4 are energized (see FIG. 3). Oxygen and hydrogen may be generated and may be attached to the small particles or the dirt in the water and may move the dirt upward for allowing the dirt to be removed. The NaCl contained in the water may be electrolyzed into OCl⁻ or HOCl- which may spoil the contaminant contained in the water.

Figure 4:
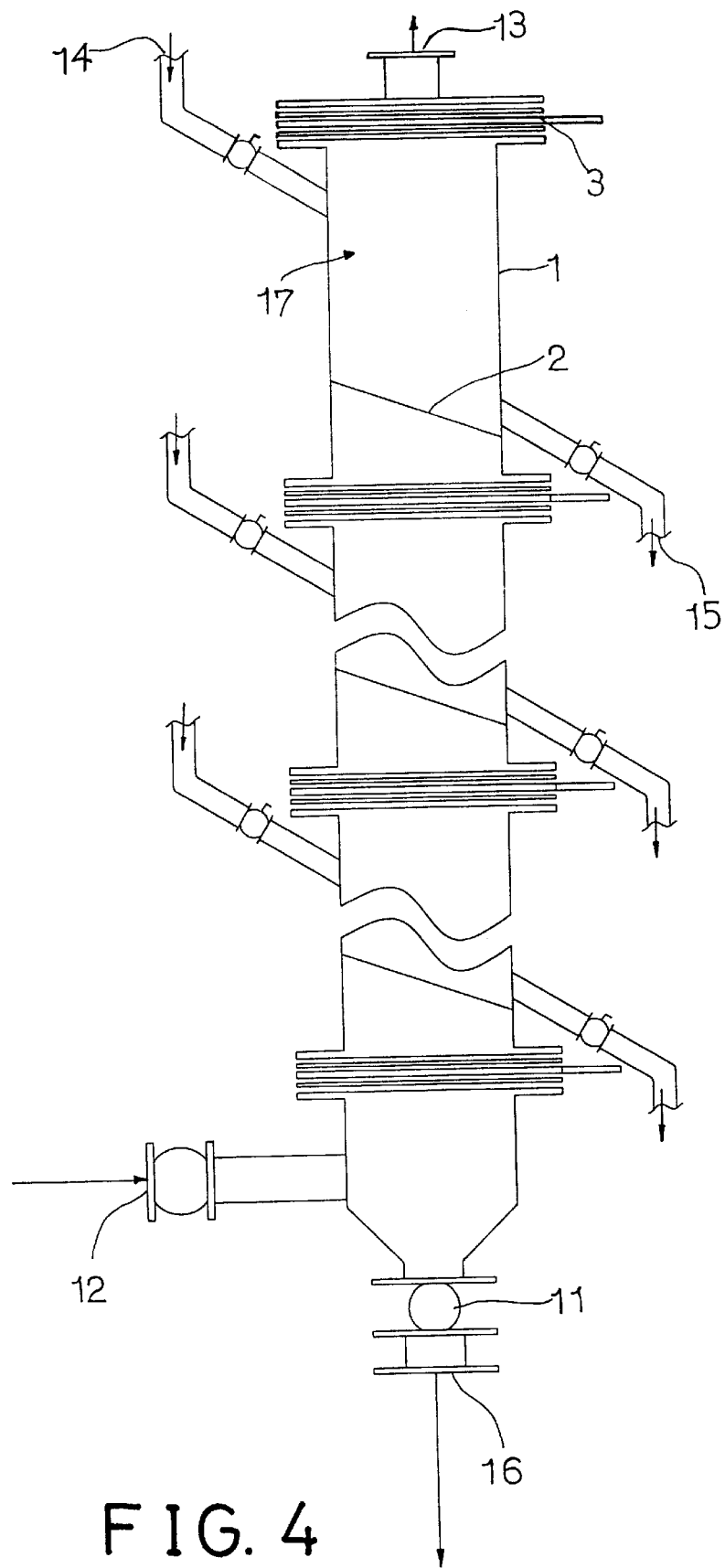
FIGS. 4, 5, 6 are plane views illustrating the arrangements of the water treating devices of the water treating apparatus.
Figure 7:
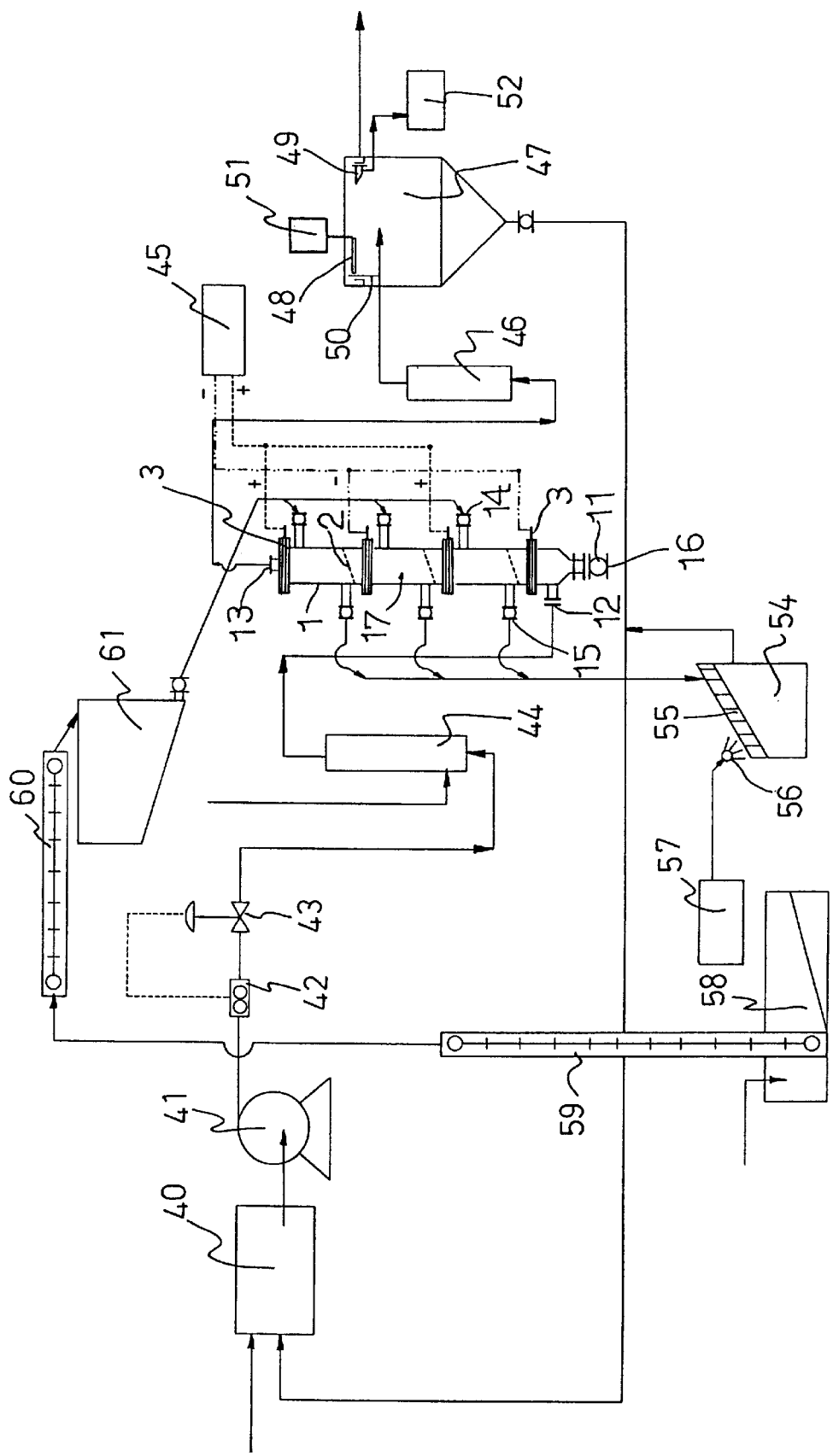
FIG. 7 is a schematic view illustrating a water treating apparatus having the water treating devices.

Referring next to FIG. 7, illustrated is a complete water treating apparatus having one or more water treating devices arranged in series (FIG. 4) for treating water. The water treating devices may also be arranged in parallel to each other (FIG. 5) or in both series and parallel arrangement (FIG. 6). The complete water treating apparatus includes a reservoir 40 for receiving the waste water to be treated. A pump 41 may be used for pumping the water received in the reservoir 40 into the housings 1 of the water treating devices via a flow meter 42 and/or a flow control valve 43 and a flow mixer 44. A clean water supply or the like may be introduced into the flow mixer 44 for adjusting the ph value of the water and for preventing the ph value from becoming too low or too high. The water may become corrosive and may damage the elements when the ph value of the water is too low or too high. The electrode boards 3 and the particles 4 may be energized by the battery 45 to treat the waste water. The treated water may flow into a container 47 via another flow mixer 46. The oxygen and the hydrogen generated in the housing 1 of the water treating device may move the dirt and the contaminant upward. The coagulating agent, for example, may be introduced into the water at the flow mixer 46 for coagulating the dirt. A remover device 48 may sweep and may move the coagulated dirt to a collector receptacle 52 via a collector chute 49. A partition or a screen 50 may further be disposed in the container 47 for separating the coagulated dirt from the treated water for allowing the treated water to be pumped out for further use by a motor or a pump 51.

The particles 4 may be corroded after use, and the dirt and/or the contaminant particles may be accumulated between the particles 4, such that the particles 4 are required to be periodically cleaned and/or replaced with the cleaned or new particles 4. A cleaner device 54 includes a screen 55 or the like disposed on top for receiving and collecting the particles 4 discharged from the water treating devices and a nozzle 56 may supply a pressurized water from a water reservoir 57 to clean the particles 4. A tank 58 may be provided for receiving and collecting the cleaned particles 4. One or more elevators or supplier devices 59, 60 may further be provided for moving the cleaned particles 4 into a box 61 for allowing the cleaned particles 4 to be introduced into the housing 1 of the water treating device again.

Accordingly, the water treating apparatus in accordance with the present invention includes one or more water treating devices for effectively treating the waste water with electro-chemistry processes.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A water treating apparatus comprising:
   at least one water treating device including:
   a) a housing having a chamber formed therein and having a lower portion, a middle portion and an upper portion, said housing including an entrance for receiving water to be treated and including an exit for discharging the water, said housing including an outlet,
   b) a plurality of electric conductive particles disposed in said chamber of said housing, and dischargeable from said housing via said outlet of said housing,
   c) a filter plate secured in said middle portion of said housing for supporting said particles in said chamber of said housing and for allowing the water to flow through said filter plate and said particles, said filter plate being inclined toward said outlet of said housing for guiding said particles toward said outlet of said housing, and
   d) means for electrifying said particles to treat the water.

2. The water treating apparatus according to claim 1, wherein said electrifying means includes a pair of electrode boards secured in said housing, and means for energizing said electrode boards.

3. The water treating apparatus according to claim 1 further comprising means for cleaning said particles after said particles are discharged from said housing.

4. The water treating apparatus according to claim 1 further comprising means for supplying said particles into said chamber of said housing.

5. The water treating apparatus according to claim 1 further comprising means for introducing the water into said housing.

6. The water treating apparatus according to claim 1 further comprising means for adjusting a PH value of the water.

7. The water treating apparatus according to claim 1 further comprising a container coupled to said housing for receiving the water after being treated.

* * * * *